UNITED STATES PATENT OFFICE.

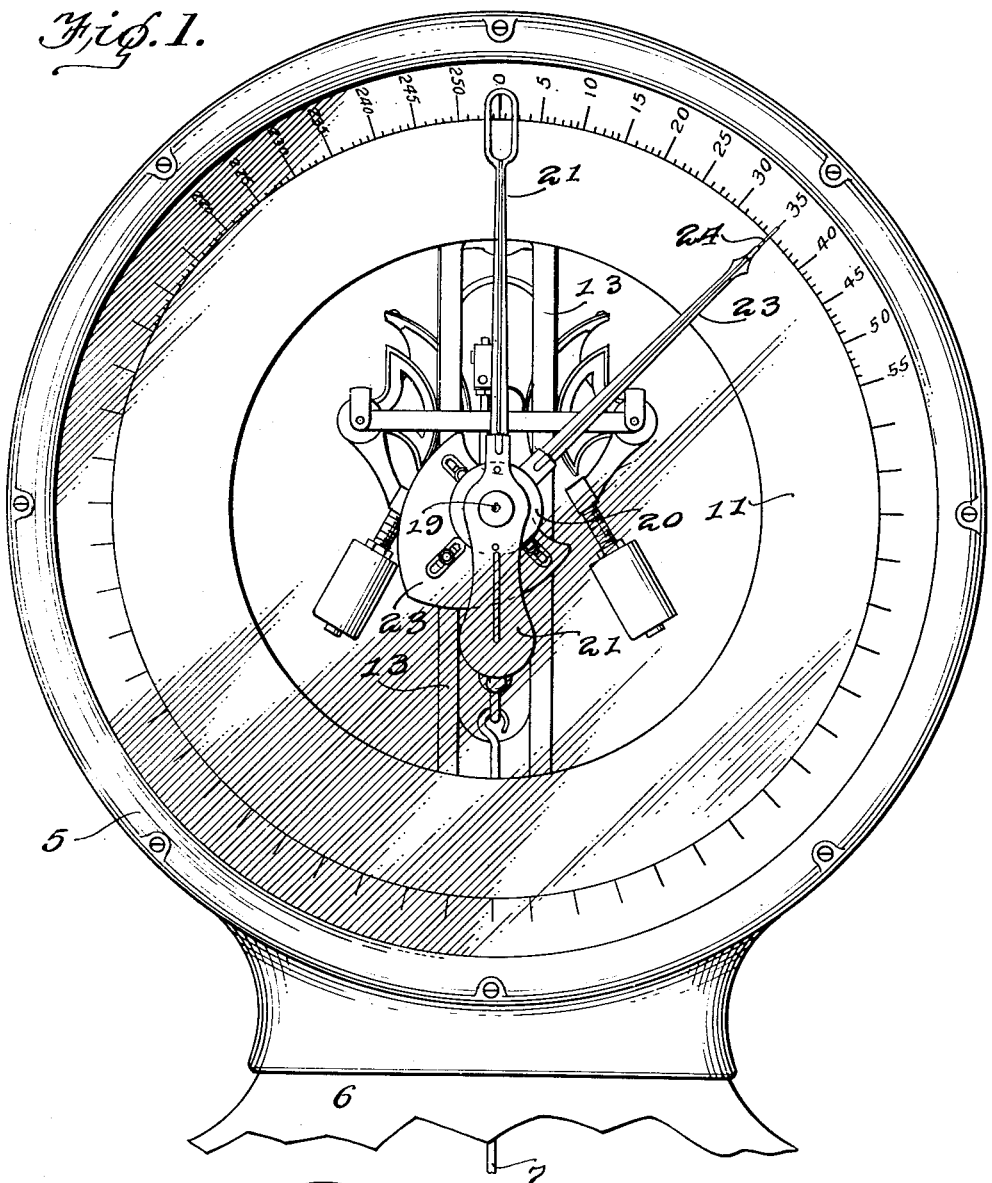
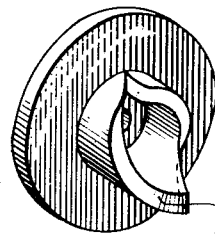

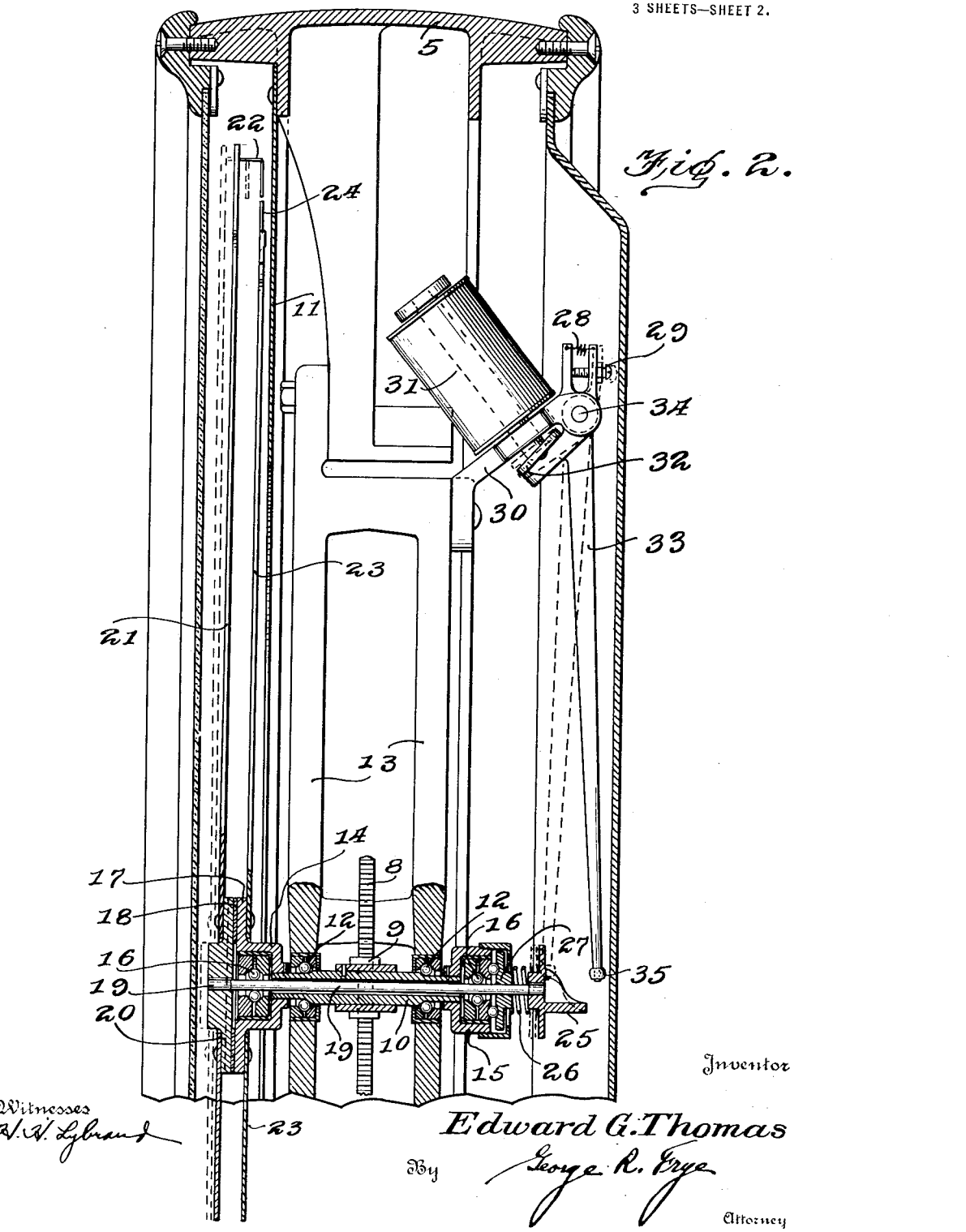

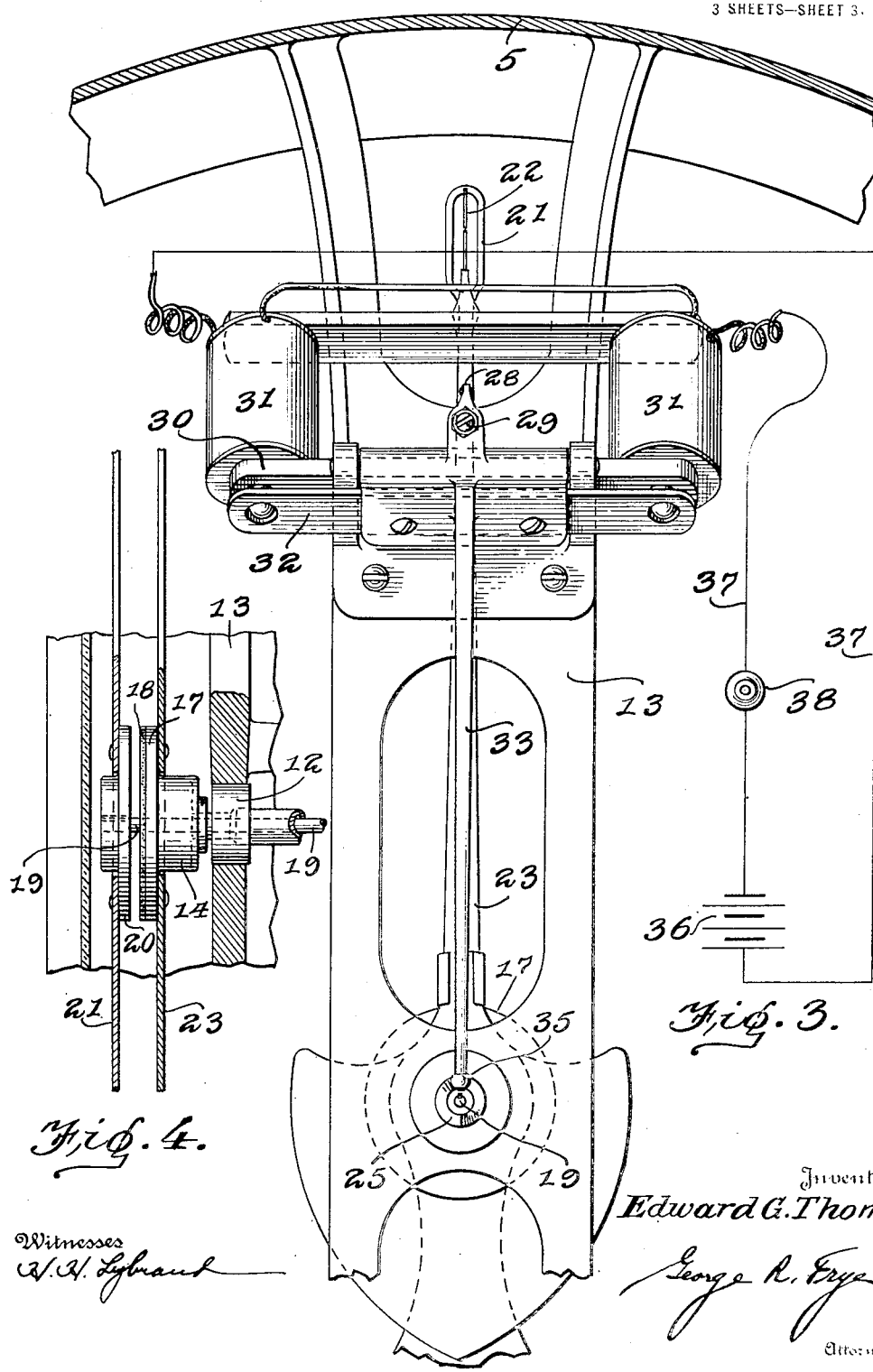

EDWARD G. THOMAS, OF TOLEDO, OHIO, ASSIGNOR TO TOLEDO SCALE COMPANY, OF TOLEDO, OHIO, A CORPORATION OF NEW JERSEY.

INDICATING MECHANISM FOR SCALES.

1,409,317.  Specification of Letters Patent.  Patented Mar. 14, 1922.

Application filed February 1, 1918. Serial No. 214,802.

*To all whom it may concern:*

Be it known that I, EDWARD G. THOMAS, a citizen of the United States, residing at Toledo, in the county of Lucas and State of Ohio, have invented certain new and useful Improvements in Indicating Mechanism for Scales, of which the following is a specification.

This invention relates to weighing scales, and more particularly to indicating means therefor arranged to conveniently and accurately indicate the net, gross and tare weights of articles being weighed.

The primary object of the invention is to provide a scale having a plurality of indicator hands positioned to indicate in unison the weights of articles upon the scale platform, while one or more of the indicating hands may be adjusted relatively to the other or others of said indicating hands by electrical means, enabling the operator to re-set said indicating hands from any desired position without disturbing the remaining indicator hands.

Furthermore, this invention provides means for indicating multiple weighings, wherein packages or articles may be separately weighed without necessitating the removal of any of them from the scale platform until all have been weighed, thereby enabling the operator to keep together an invoice of goods for delivery or shipment; or for accurately weighing the several ingredients that enter into a compound of medicine, a mixture of bread, etc., or the formula of an alloy of metals, the compounding whereof may be performed without necessitating the removal of the container or holding vessel from the scale platform.

With the above and other objects in view which will readily appear after the invention is better understood, my invention consists in the novel construction, combination and arrangement of parts to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:—

Figure 1 is a front elevation of the upper portion of a scale showing an embodiment of my invention;

Figure 2 is a side elevation on a scale larger than that in Figure 1, with parts sectioned on the center line of the mechanism in order to portray its construction;

Figure 3 is a rear elevation of the mechanism, a large portion of the casing being removed;

Figure 4 is a side elevation of a portion of the apparatus when in operation; and Figure 5 is an isometric view of an axial heart-shaped cam which is employed in the apparatus.

In the drawings, 5 designates the casing of a scale adapted to enclose the weighing mechanism and supported upon a suitable column 6, the lower end of which rests on the platform mechanism (not shown). It is to be understood that any suitable platform or platform lever mechanism may be employed in connection with the weighing mechanism of the scale, and the weighing mechanism herein shown is illustrated merely for the purpose of showing one application of the indicating mechanism upon a well-known scale. The particular pendulum weighing mechanism herein shown has been found to successfully demonstrate the capabilities of this invention and comprises a double pendulum scale adapted to be suitably connected with the platform lever mechanism through the medium of an adjustable hook rod 7 and so arranged and positioned that upon the placing of the load upon the scale platform the pendulums will be swung upwardly into a position counterbalancing the weight of the load on the platform, connection being made from the weighing mechanism whereby the upward movement of the pendulums will be transmitted to the indicating mechanism through a rack 8 meshing with a pinion 9 on the indicating shaft 10. A plurality of indicator hands are arranged to be rotated upon movement of the indicating shaft and cooperate with the dial 11 to indicate the weight or weights of articles placed upon the scale platform. Inasmuch as the present invention is not dependent for its operation upon any particular form of pendulum weighing mechanism, no attempt is made in this application to show a complete scale mechanism nor to portray the action of the scale in its load-counterbalancing or weighing operations, only so much of the pendulum weighing mechanism being shown as is necessary to clearly show the operation and co-action of the claimed invention herein disclosed.

The indicating shaft 10 is formed as a hollow sleeve resting in ball bearings 12 mounted in the framework 13 of the scale, these ball bearings being arranged one on each side of the pinion 9, as illustrated in Figure 2. At each end the shaft 10 carries a ball bearing holder 14, 15, in which are located ball bearings 16, 16. The ball bearing holder 14 is provided with a clutch face 17 to which may be attached a facing 18 of leather or other suitable substance. A shaft 19 is journalled in the ball bearings 16 and to its forward end is secured a clutch member 20 adapted to co-operate with the clutch face 17. Secured to the clutch member 20 is an accurately balanced indicating hand 21 having a pointer 22 arranged to register closely with the indications upon the dial 11 of the scale, this hand being further described as the adjustable indicating hand. On the clutch face 17 similarly is secured an indicating hand 23 having a pointer 24 also adapted to register closely with the indications upon the dial 11, this hand being in the future referred to as the fixed indicating hand.

At the rear end of the shaft 19 is secured a substantially heart-shaped cam 25 preferably arranged with its bearing surface inclined relatively to the shaft, the point of the heart being in a different vertical plane from the notch thereof. A thrust ball bearing is attached to the ball bearing holder 15 and a compression spring 26 is placed between the outer race 27 of the thrust ball bearing and the casting which forms the heart-shaped cam 25, the spring serving to hold the clutch member 20 firmly in contact with the clutch face 17 whenever the operating mechanism of this device is not energized. A bracket 30 is secured to the frame 13 of the scale mechanism and the magnet 31 is mounted thereon. The armature 32 of the magnet 31 is attached to the bell crank lever 33 pivoted in bracket 30 at the point 34. The ends of the cores of the magnet 31 and armature 32 are so related in shape as to produce, so far as possible, a pull of substantially even force over the entire travel of the armature. At the lower end of the bell crank lever 33 is a roller 35 arranged to engage the operating surface of a heart-shaped cam 25 when forced toward the left in Fig. 2 by the pull of the magnet 31 upon its armature 32, the pressure of the roller 35 performing two offices: first, to force the heart-shaped cam shaft 19 and contact member 20 sufficiently toward the front of the machine, against the resistance of spring 26, to release the clutch member 20 from the clutch face 17 so as to permit rotation of the shaft 19 and attached parts independently of the motion of the indicating shaft 10 and attached parts; and second, to turn the heart-shaped cam 25, shaft 19, clutch member 20, and adjustable indicating hand 21 to a point where the roller 35 will rest in the V formed by the junction of the sides of the heart-shaped cam, this being the end of the motion which can be produced by the action of the roller against the cam. The relation between the adjustable indicating hand 21 and shaft 19 is such that when the roller occupies the described position in the V of the heart-shaped cam, the pointer on the adjustable indicating hand will indicate zero upon the dial—the location to which the adjustable hand will always be returned by the action of the roller 35 against the heart-shaped cam. The relation of the parts at this time is shown by the dotted lines in Figure 2 and in Figure 4, which shows the separation of the clutch faces, allowing independent rotation of the fixed and adjustable indicating hands.

Inasmuch as the position of the fixed indicating hand 23 depends on the co-action of the weight upon the scale and the resistance offered by the pendulum mechanism, it requires substantially frictionless co-operating parts to prevent its being disturbed, and the purpose of the ball bearing support of shaft 19 is to permit the rotation of the shaft 19 without the transmission of appreciable rotative force to shaft 10 so that during the movement of the adjustable indicating hand 21 the fixed indicating hand will remain in its position indicating the weight of the material upon the scale.

When the magnet 31 is de-energized the bell crank lever 33 is returned to a position where roller 35 will not engage any portion of the heart-shaped cam 25 by means of a tension spring 28 and an adjustable stop 29. The circuit of the magnet 31 will include a source of electric energy 36, circuit wires 37 and a push button or other closing device 38, which may be located at any convenient point.

My device will be operated as follows: When an article is placed upon the scale platform the weighing mechanism of the scale is moved to offset the weight of such article and in so doing rotates the indicating shaft through the medium of the rack 8 and pinion 9, thereby rotating the fixed indicating hand 23 through an arc sufficient to indicate on the dial 11 the weight of such article. Since normally the clutch member 20 carrying the adjustable indicating hand 21 is pressed into engagement with the clutch face 17 the adjustable indicating hand will likewise be rotated through the same arc as the fixed indicating hand and in unison therewith in indicating the weight of the article. Thus, when it is desired to secure only the gross weight of an article or articles, the fixed and adjustable indicating hands operate together to indicate such weight. In order to utilize the scale as a net, gross and tare weight indicator the container, such as a box or holding vessel, is first placed on the platform and both of the indicating hands 21 and 23 will be rotated by the weighing mechanism until they indicate the weight of the container on the dial 11. In order now to return the adjustable indicating hand 21 to zero the push button 38 is pressed, closing the circuit 37 of the magnet 31. The armature 32 is attracted and drawn to the left in Figure 2, thus imparting to the roller 35 a similar motion. The roller 35 coming into contact with the surface of the heart-shaped cam 25 will press it toward the front of the machine sufficiently to release frictional contact between clutch members 20 and 17, and under the action of further pressure of roller 35, the heart-shaped cam, shaft 19, clutch member 20, and adjustable indicating hand 21 will be rotated until the roller 35 reaches the lowest part of the cam and rests in the V-shaped portion formed by the junction of the surfaces of the cam. The adjustable indicating hand will thus be returned to its zero position, and upon opening the circuit at the push button 38 the roller 35 will be retracted to its original position by the spring 28, and the spring 26 will force shaft 19 and attached parts to the right until frictional contact is again established between clutch member 20 and clutch face 17. The commodity to be weighed is now placed in the container, whereupon the hands 23 and 21 are again rotated until the combined weight of the commodity and container is offset by the scale mechanism, the fixed indicating hand 23 showing on the dial this combined or gross weight. The adjustable hand 21, however, moving from zero on the last weighing, will show only the weight of the commodity in the container, or the net weight desired. The tare—i. e., the weight of the container—is, of course, indicated by the weight shown between the fixed and adjustable hands. Should it be desired to weigh other articles in the same container without removing this commodity or ingredient— for instance, in the mixing of compounds— the indicating hand can again be returned to zero as hereinbefore described and the next article placed on the platform of the scale. The two hands will thereupon rotate together until the combined weights of all the articles on the platform are indicated by the fixed hand 23. The weight of the last commodity placed on the platform will be shown by the adjustable indicating hand 21. This operation may be repeatedly performed until the full capacity of the dial has been reached, and in case the scale is also equipped with beams the weight thus totaled can be transferred to such increased capacity beams, thereby returning both the fixed and adjustable hands into registration with the zero graduation, and additional weighings can be continued until the full weighing capacity of the scale is reached.

While it is apparent that the illustrated embodiment of my invention herein disclosed is well calculated to adequately fulfill the objects primarily stated, it is to be understood that my invention is susceptible to variation, modification and change without departing from the spirit and scope of the invention as set forth in the subjoined claims.

Having described my invention, I claim:

1. In a device of the class described, in combination, weighing mechanism, an indicator, means connecting the indicator and weighing mechanism, a cam mounted for axial and rotary movement, means for moving said cam axially to disconnect said connecting means, and means for rotating said cam to rotate said indicator.

2. In a device of the class described, in combination, weighing mechanism, an indicator hand connected thereto, a re-setting device, and means actuated by movement of said re-setting device in one direction to successively disconnect said indicator hand and move it to zero position.

3. In a scale and in combination with the weighing mechanism thereof, a pair of concentrically pivoted indicator hands, one of which is directly connected with the weighing mechanism of the scale, a clutch connecting the second indicator hand with the first-mentioned hand for simultaneous rotation, switch-controlled means for producing successive axial and rotative movements of the second indicator hand to disconnect the same and then rotate it relatively to the first indicator hand and means for normally holding said switch controlled means in non-interfering relation to said indicator hands.

4. In a scale and in combination with the weighing mechanism thereof, a pair of concentrically pivoted indicator hands, one of which is directly connected with the weighing mechanism of the scale, a clutch connecting the second indicator hand with the first-mentioned hand for simultaneous rotation, switch-controlled electrically actuated means for producing successive axial and rotative movements of the second indicator hand to disconnect the same and then rotate it relatively to the first indicator hand and means for normally holding said switch controlled means in non-interfering relation to said indicator hands.

5. In a scale and in combination with the weighing mechanism thereof, a pair of concentrically pivoted indicator hands, one of which is directly connected with the weighing mechanism of the scale, a clutch connecting the second indicator hand with the first-mentioned hand for simultaneous rotation, and electrically actuated means including a magnet, means co-operating with the magnet to produce successive axial and rotative movements of the second indicator hand to disconnect the same and then rotate it relatively to the first indicator hand.

6. In a scale and in combination with the weighing mechanism thereof, a pair of concentrically pivoted indicator hands, one of which is directly connected with the weighing mechanism of the scale, a clutch connecting the second indicator hand with the first-mentioned hand for simultaneous rotation, a cam member carried by the second indicator hand and electrically actuated means including a circuit, a member controlled by completion of the circuit to be moved into position to engage said cam to produce successive axial and rotative movements of the second indicator hand to disconnect it from and then rotate it relatively to the first indicator hand.

7. In a scale and in combination with the weighing mechanism thereof, a pair of concentrically pivoted indicator hands, one of which is directly connected with the weighing mechanism of the scale, a clutch connecting the second indicator hand with the first-mentioned hand for simultaneous rotation, an axial heart-shaped cam connected with the second indicator hand, and means for engaging the heart-shaped cam to produce successive axial and rotative movements of the second indicator hand to disconnect the same and then rotate it relatively to the first indicator hand.

8. In a scale and in combination with the weighing mechanism thereof, a pair of concentrically pivoted indicator hands, one of which is directly connected with the weighing mechanism of the scale, a clutch connecting the second indicator hand with the first-mentioned hand for simultaneous rotation, an axial heart-shaped cam connected with the second indicator hand, and electrically actuated means including a member arranged to engage the heart-shaped cam to produce successive axial and rotative movements of the second indicator hand to disconnect the same and then to rotate it relatively to the first indicator hand.

9. In a scale and in combination with the weighing mechanism thereof, a pair of concentrically pivoted indicator hands, one of which is directly connected with the weighing mechanism of the scale, a clutch connecting the second indicator hand with the first-mentioned hand for simultaneous rotation, an axial heart-shaped cam connected with the second indicator hand, a member arranged to engage the heart-shaped cam by a movement parallel with the axis of rotation of said indicator hand, and means for moving said member in the described direction.

10. In a scale and in combination with the weighing mechanism thereof, a pair of concentrically pivoted indicator hands, one of which is directly connected with the weighing mechanism of the scale, a clutch connecting the second indicator hand with the first-mentioned hand for simultaneous rotation, an axial heart-shaped cam connected with the second indicator hand, a member arranged to engage the heart-shaped cam by a movement parallel with the axis of rotation of said indicator hand, and electrically actuated means for moving said member in the described direction.

11. In a scale and in combination with the weighing mechanism thereof, a pair of concentrically pivoted indicator hands, one of which is directly connected with the weighing mechanism of the scale, a clutch connecting the second indicator hand with the first-mentioned hand for simultaneous rotation, an axial heart-shaped cam connected with the second indicator hand, a member arranged to engage the heart-shaped cam by a movement parallel with the axis of rotation of said indicator hand, and electrically actuated means including a magnet, the armature of which is arranged for moving said member in the described direction.

12. In a scale and in combination with the weighing mechanism thereof, a pair of concentrically pivoted indicator hands, one of which is directly connected with the weighing mechanism of the scale, a clutch connecting the second indictor hand with the first-mentioned hand for simultaneous rotation, an axial heart-shaped cam connected with the second indicator hand, a pivoted lever arranged to engage the heart-shaped cam by a movement in a plane parallel to the axis of rotation of said indicator hands, and means for imparting motion to said lever.

13. In a scale and in combination with the weighing mechanism thereof, a pair of concentrically pivoted indicator hands, one of which is directly connected with the weighing mechanism of the scale, a clutch connecting the second indicator hand with the first-mentioned hand for simultaneous rotation, an axial heart-shaped cam connected with the second indicator hand, a pivoted member carrying a roller arranged to engage the heart-shaped cam by a movement in a plane parallel to the axis of rotation of said indicator hands, and means for imparting motion to said lever.

14. In a scale and in combination with the weighing mechanism thereof, a pair of concentrically pivoted indicator hands, one of which is directly connected with the weighing mechanism of the scale, a clutch connecting the second indicator hand with the first-mentioned hand for simultaneous rotation, an axial heart-shaped cam connected with the second indicator hand, a pivoted lever arranged to engage the heart-shaped cam by a movement in a plane parallel to the axis of rotation of said indicator hands, an armature connected with said lever, an electro-magnet mounted on the frame-work of the scale, and circuit-closing means to energize the magnet to impart motion to said lever.

15. In a scale and in combination with the weighing mechanism thereof, a pair of concentrically pivoted indicator hands, one of which is directly connected with the weighing mechanism of the scale, a clutch connecting the second indicator hand with the first-mentioned hand for simultaneous rotation, an axial heart-shaped cam connected with the second indicator hand, a pivoted lever arranged to engage the heart-shaped cam by a movement in a plane parallel to the axis of rotation of said indicator hands, and electrically actuated means for imparting motion to said lever.

16. In a scale and in combination with the weighing mechanism thereof, a pair of concentrically pivoted indicator hands, one of which is directly connected with the weighing mechanism of the scale, a clutch connecting the second indicator hand with the first-mentioned hand for simultaneous rotation, an axial heart-shaped cam connected with the second indicator hand, a pivoted lever arranged to engage the heart-shaped cam by a movement in a plane parallel to the axis of rotation of said indicator hand, and electrically actuated means including a circuit having a movable member connected with the lever and adapted to be moved upon completion of the circuit.

17. In a scale and in combination with the weighing mechanism thereof, a pair of indicator hands, a hollow shaft arranged for rotation upon movement of the weighing mechanism and carrying one of said indicator hands, a second shaft concentrically arranged within the hollow shaft and carrying the second indicator hand, clutch members secured to the hollow shaft, co-operating clutch members secured to the second shaft and arranged to engage the clutch members upon the hollow shaft by an axial movement, and means for producing axial motion of said second shaft to release said clutch and rotative motion to revolve said second indicator hand to a desired position in reference to the chart of the scale.

18. In a scale and in combination with the weighing mechanism thereof, a pair of indicator hands, a hollow shaft arranged for rotation upon movement of the weighing mechanism and carrying one of said indicator hands, a second shaft concentrically arranged within the hollow shaft and carrying the second indicator hand, clutch members respectively secured to the hollow shaft and the second shaft for causing simultaneous rotation of the two indicator hands under normal conditions, an axial heart-shaped cam secured to the second shaft, and a member arranged to engage said heart-shaped cam by a movement in a plane parallel to the axis of rotation of said shafts and to produce a longitudinal motion of said second shaft sufficient to release said clutch members and to rotate said shaft and attached indicator hand to a desired point upon the chart of the scale.

EDWARD G. THOMAS.

Witnesses:
A. H. BEELEY,
H. H. LYBRAND.